United States Patent
Wang et al.

(10) Patent No.: US 9,454,242 B2
(45) Date of Patent: Sep. 27, 2016

(54) OPTICAL DISPLACEMENT DETECTION APPARATUS AND OPTICAL DISPLACEMENT DETECTION METHOD THEREOF

(71) Applicants: Yen-Chang Wang, Hsin-Chu (TW); Chun-Wei Chen, Hsin-Chu (TW)

(72) Inventors: Yen-Chang Wang, Hsin-Chu (TW); Chun-Wei Chen, Hsin-Chu (TW)

(73) Assignee: PIXART IMAGING INCORPORATION, Hsin-Chu (TW)

( * ) Notice: Subject to any disclaimer, the term of this patent is extended or adjusted under 35 U.S.C. 154(b) by 825 days.

(21) Appl. No.: 13/849,223

(22) Filed: Mar. 22, 2013

(65) Prior Publication Data
US 2014/0028561 A1 Jan. 30, 2014

(30) Foreign Application Priority Data
Jul. 27, 2012 (TW) .............................. 101127085 A (51) Int. Cl.
*G06F 3/033* (2013.01)

(52) U.S. Cl.
CPC .................................... *G06F 3/033* (2013.01)

(58) Field of Classification Search
CPC .. G06F 3/0317; G06F 3/0416; G06F 3/0425; G06F 3/038; G06F 3/03543; G06F 3/03547; G06F 3/033; G06F 3/03
See application file for complete search history.

(56) References Cited

U.S. PATENT DOCUMENTS

| 8,390,736 | B2 | 3/2013 | Yang et al. |
| 2006/0087495 | A1 | 4/2006 | Davis et al. |
| 2010/0195935 | A1* | 8/2010 | Brosnan ................. G06F 3/0317 382/321 |

* cited by examiner

*Primary Examiner* — MD Saiful A Siddiqui
(74) *Attorney, Agent, or Firm* — Tung & Associates (57) ABSTRACT

The present invention discloses an optical displacement detection apparatus and an optical displacement detection method. The optical displacement detection apparatus includes: a light source for projecting light on a surface; an image capturing unit for generating an image signal according to light reflected from the surface; and a processing unit for generating an auto-exposure (AE) state value and an image quality (IQ) value according to the image signal, and determining an AE range according to an initial AE range, the AE state value and the IQ value.

16 Claims, 5 Drawing Sheets

OPTICAL DISPLACEMENT DETECTION APPARATUS AND OPTICAL DISPLACEMENT DETECTION METHOD THEREOF

CROSS REFERENCE

The present invention claims priority to TW 101127085, filed on Jul. 27, 2012.

BACKGROUND OF THE INVENTION

1. Field of Invention

The present invention relates to an optical displacement detection apparatus and an optical displacement detection method; particularly, it relates to such optical displacement detection apparatus and optical displacement detection method which adaptively select auto-exposure range.

2. Description of Related Art

Among various applications of the optical displacement detection apparatus, the optical mouse is the most popular one. In an optical mouse, the light emitted from the light source is transmitted to and reflected by a surface such as the top of a desk, and the reflected light is received by a sensor chip embedded in the optical mouse. The sensor chip converts the optical signal to an electrical signal, and outputs the electrical signal to a processor. The processor calculates the electrical signal, to determine the displacement of the optical mouse.

Specifically, in the optical mouse, when the brightness of the surface is unevenly distributed, a dark zone will be formed. Even though the detected exposure state falls within the range of auto-exposure (AE), if the pattern to be tracked is in the dark zone, the sensitivity of the sensor chip to distinguish the pattern is reduced and it becomes difficult to extract correct features of the pattern. Accordingly, the calculation of the displacement tends to be incorrect due to the incorrectness of the obtained pattern features.

In view of the above, to overcome the drawbacks in the prior art, the present invention proposes an optical displacement detection apparatus and an optical displacement detection method. The present invention adaptively selects the AE range so that the optical displacement detection apparatus can track the pattern more accurately, thereby improving the accuracy of the displacement detection.

SUMMARY OF THE INVENTION

A first objective of the present invention is to provide an optical displacement detection apparatus.

A second objective of the present invention is to provide an optical displacement detection method.

To achieve the above and other objectives, from one perspective, the present invention provides an optical displacement detection apparatus, comprising: alight source for projecting light on a surface; an image capturing unit for generating an image signal according to light reflected from the surface; and a processing unit for generating an auto-exposure(AE) state value and an image quality (IQ) value according to the image signal, and determining an AE range according to an initial AE range, the AE state value and the IQ value.

From another perspective, the present invention provides an optical displacement detection method, comprising: projecting light on a surface; generating an image signal according to light reflected from the surface; generating an auto-exposure (AE) state value and an image quality (IQ) value according to the image signal; and determining an AE range according to an initial AE range, the AE state value and the image quality.

In one embodiment, the processing unit determines the AE range according to following conditions: (1) when the initial AE range is a relatively high exposure range and either the AE state value is lower than a AE threshold or the IQ is higher than an IQ threshold, the processing unit sets the AE range to a relatively low exposure range; (2) when the initial AE range is the relatively high exposure range and either the AE state value is not lower than the AE threshold or the IQ is not higher than the IQ threshold, the processing unit sets the AE range to the relatively high exposure range; (3) when the initial AE range is not the relatively high exposure range and either the AE state value is higher than the AE threshold or the IQ is lower than the IQ threshold, the processing unit sets the AE range to the relatively high exposure range; and (4) when the initial AE range is not the relatively high exposure range and either the AE state value is not higher than the AE threshold or the IQ is not lower than the IQ threshold, the processing unit sets the AE range to the relatively low exposure range.

In another embodiment, the processing unit determines the AE range according to following conditions: (1) when the initial AE range is a relatively high exposure range and either the AE state value is lower than a first AE threshold or the IQ is higher than an IQ threshold, the processing unit sets the AE range to a relatively low exposure range; and (2) when the initial AE range is the relatively high exposure range and either the AE state value is not lower than the first AE threshold or the IQ is not higher than the IQ threshold, the processing unit determines the AE range according to the following condition (3) or (4): (3) when the above-mentioned condition (2) occurs or when the initial AE range is not the relatively high exposure range, and when either the AE state value is higher than a second AE threshold or the IQ is lower than the IQ threshold, the processing unit sets the AE range to the relatively high exposure range; and (4) when the above-mentioned condition (2) occurs or when the initial AE range is not the relatively high exposure range, and when either the AE state value is not higher than the second AE threshold or the IQ is not lower than the IQ threshold, the processing unit sets the AE range to the relatively low exposure range.

In yet another embodiment, the processing unit determines the AE range according to following conditions: (1) when the initial AE range is a relatively high exposure range and either the AE state value is lower than a AE threshold or the IQ is higher than a first IQ threshold, the processing unit sets the AE range to a relatively low exposure range; and (2) when the initial AE range is the relatively high exposure range and either the AE state value is not lower than the AE threshold or the IQ is not higher than the first IQ threshold, the processing unit determines the AE range according to the following condition (3) or (4): (3) when the above-mentioned condition (2) occurs or when the initial AE range is not the relatively high exposure range, and when either the AE state value is higher than the AE threshold or the IQ is lower than a second IQ threshold, the processing unit sets the AE range to the relatively high exposure range; and (4) when the above-mentioned condition (2) occurs or when the initial AE range is not the relatively high exposure range, and when either the AE state value is not higher than the AE threshold or the IQ is not lower than the second IQ threshold, the processing unit sets the AE range to the relatively low exposure range.

In still another embodiment, the processing unit determines the AE range according to following conditions: (1) when the initial AE range is a relatively high exposure range and either the AE state value is lower than a first AE threshold or the IQ is higher than a first IQ threshold, the processing unit sets the AE range to a relatively low exposure range; and (2) when the initial AE range is the relatively high exposure range and either the AE state value is not lower than the first AE threshold or the IQ is not higher than the first IQ threshold, the processing unit determines the AE range according to the following condition (3) or (4): (3) when the above-mentioned condition (2) occurs or when the initial AE range is not the relatively high exposure range, and when either the AE state value is higher than a second AE threshold or the IQ is lower than a second IQ threshold, the processing unit sets the AE range to the relatively high exposure range; and (4) when the above-mentioned condition (2) occurs or when the initial AE range is not the relatively high exposure range, and when either the AE state value is not higher than the second AE threshold or the IQ is not lower than the second IQ threshold, the processing unit sets the AE range to the relatively low exposure range.

In above-mentioned embodiments, the processing unit preferably adjusts the image signal according to the AE range so as to determine a displacement of the optical displacement detection apparatus.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the devices and the units, but not drawn according to actual scale.

Figure 1:
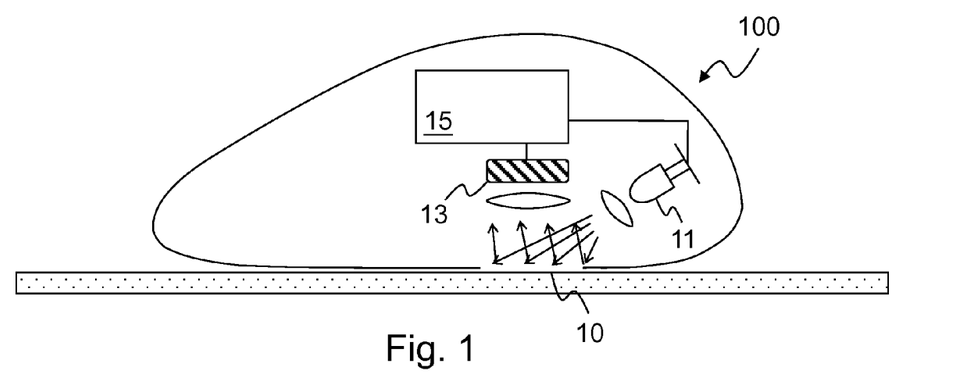
FIG. 1 shows a schematic view of an optical displacement detection apparatus according to the first embodiment of the present invention.

Please refer to FIG. 1, which shows a schematic view of an optical displacement detection apparatus according to the first embodiment of the present invention. The optical displacement detection apparatus of the present invention is, for example, an optical mouse 100, which comprises a light source 11, an image capturing unit 13 and a processing unit 15. The light source 11 is, for example but limited to, alight emitting diode (LED) or a laser diode (LD). The light source 11 projects light on a surface 10, wherein the surface 10 is, for example but not limited to, a top of a desk or any other surface. The image capturing unit 13 receives the light reflected from the surface 10 to capture the pattern or the roughness on the surface 10 and generate an image signal. The image signal is transmitted to the processing unit 15. The image capturing unit 13 is, for example but not limited to, an image sensor capable of sensing an image of the surface or a roughness sensor capable of measuring a roughness of the surface, which is well-known to those skilled in the art and is therefore not redundantly explained in detail here. The processing unit 15 calculates and generates an auto-exposure (AE) state value and an image quality (IQ) value according to the image signal.

More specifically, "auto-exposure (AE) state value" refers to an index related to the exposure state of an image captured by the image capturing unit 13. This index, for example, can be an average pixel brightness (or a calculation result of the pixel brightness with weightings) of all or a specific region of the image. A high AE state value indicates that the image as a whole has a high exposure brightness, while a low AE state value indicates that the image as a whole has a low exposure brightness. "Image quality (IQ) value" refers to an index related to one or more quality parameters of an image captured by the image capturing unit 13, such as image sharpness, noise, contrast and distortion, which can be calculated by various known ways (e.g., by calculating the difference of brightness between two neighboring pixels). A high IQ value indicates that the image as a whole has a high quality, while a low IQ value indicates that the image as a whole has a low quality.

Figure 2:
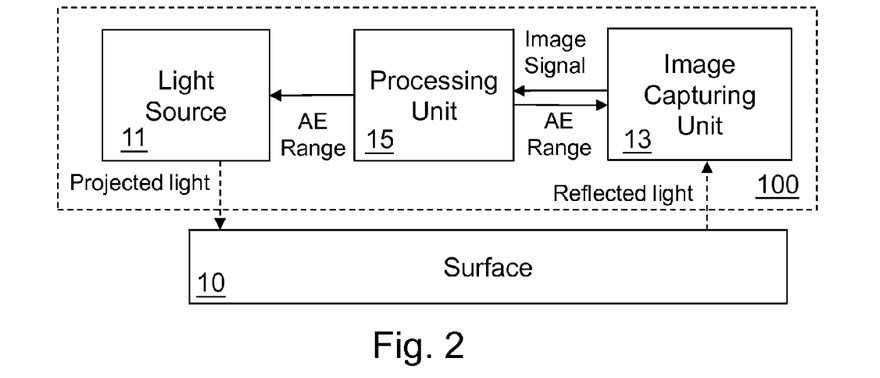
FIG. 2 shows a block diagram of the first embodiment.

FIG. 2 shows a block diagram of the second embodiment. As described previously, the processing unit 15 controls the light source 11 to project light on the surface 10. The image capturing unit 13 receives the light reflected from the surface 10 and generates an image signal. The image signal is transmitted to the processing unit 15. The processing unit 15 calculates the AE state value and the IQ value according to the image signal, and determines an AE range according to an initial AE range, the AE state value and the IQ value. In addition, the processing unit 15 adjusts the image signal according to the AE range so as to determine a displacement of the optical mouse 100.

More specifically, "AE range" refers to a controllable parameter by the optical mouse 100, which includes, for example but not limited to, one or a combination of two or more of the followings: the intensity of the light emitted by the light source 11, the duration of the light emitted by the light source 11, the duration of the image capturing (exposure) time by the image capturing unit 13, or a function of two or more of the above. In addition, the initial AE range can be, for example but not limited to, a predetermined default setting, a range determined by the processing unit after the optical mouse 100 detects the surrounding environment, or a range determined according to the last stored AE range.

Figure 3:
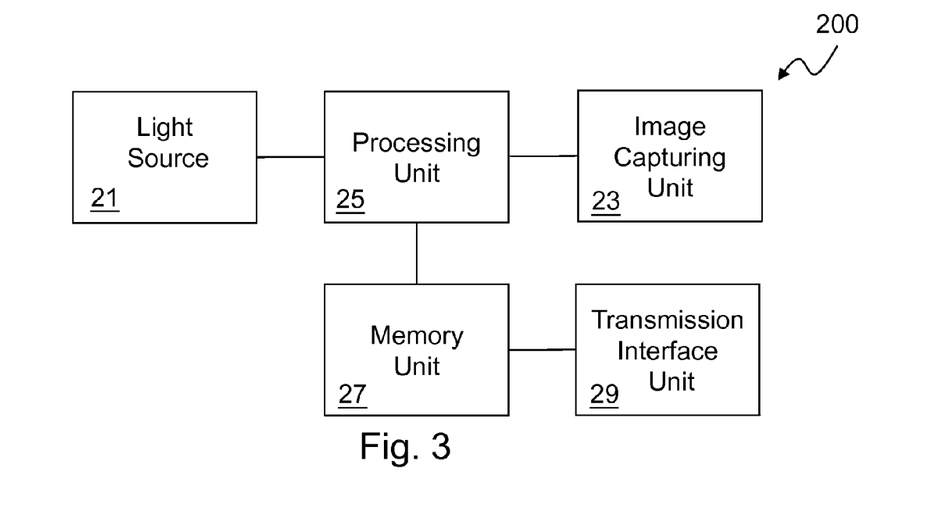
FIG. 3 shows a second embodiment of the present invention.

FIG. 3 shows a second embodiment of the present invention. This second embodiment illustrates that, in addition to a light source 21, an image capturing unit 23 and a processing unit 25, the optical displacement detection apparatus 200 may further comprise a memory unit 27 and a transmission interface unit 29. The memory unit 27 is for storing the calculation result or the data for use in the calculation. The transmission interface unit 29 is an interface for outputting the calculation result and receiving external signals.

Figure 4:
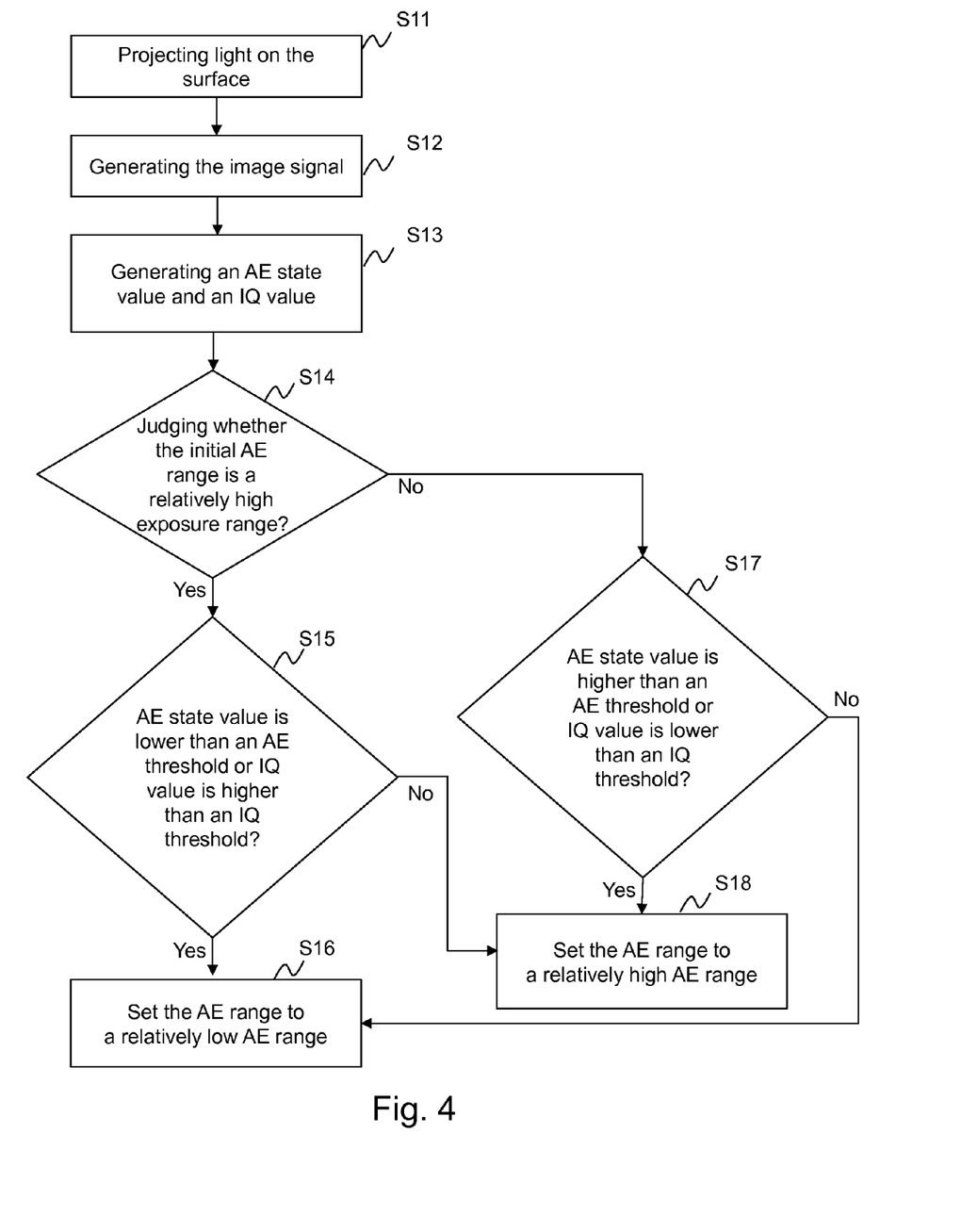
FIG. 4 shows a third embodiment of the present invention.

FIG. 4 shows a third embodiment of the present invention, which illustrates a flowchart of determining the AE range. First, as shown in the step S11 of FIG. 4, the light source projects light on the surface. Next, as shown in the step S12 of FIG. 4, the image capturing unit generates the image signal. Next, as shown in the step S13 of FIG. 4, the processing unit calculates the AE state value of the image signal. Next, as shown in the step S14 of FIG. 4, the processing unit judges whether the initial AE range is a relatively high exposure range, and determining the AE range according to following conditions:

(1) when the initial AE range is a relatively high exposure range and either the AE state value is lower than a AE threshold or the IQ value is higher than an IQ value threshold (the step S15), the processing unit sets the AE range to a relatively low exposure range (the step S16);

(2) when the initial AE range is the relatively high exposure range and either the AE state value is not lower than the AE threshold or the IQ value is not higher than the IQ value threshold (the step S15), the processing unit sets the AE range to the relatively high exposure range (the step S18);

(3) when the initial AE range is not the relatively high exposure range and either the AE state value is higher than the AE threshold or the IQ value is lower than the IQ value threshold (the step S17), the processing unit sets the AE range to the relatively high exposure range (the step S18);

(4) when the initial AE range is not the relatively high exposure range and either the AE state value is not higher than the AE threshold or the IQ value is not lower than the IQ value threshold (the step S17), the processing unit sets the AE range to the relatively low exposure range (the step S16).

Figure 5:
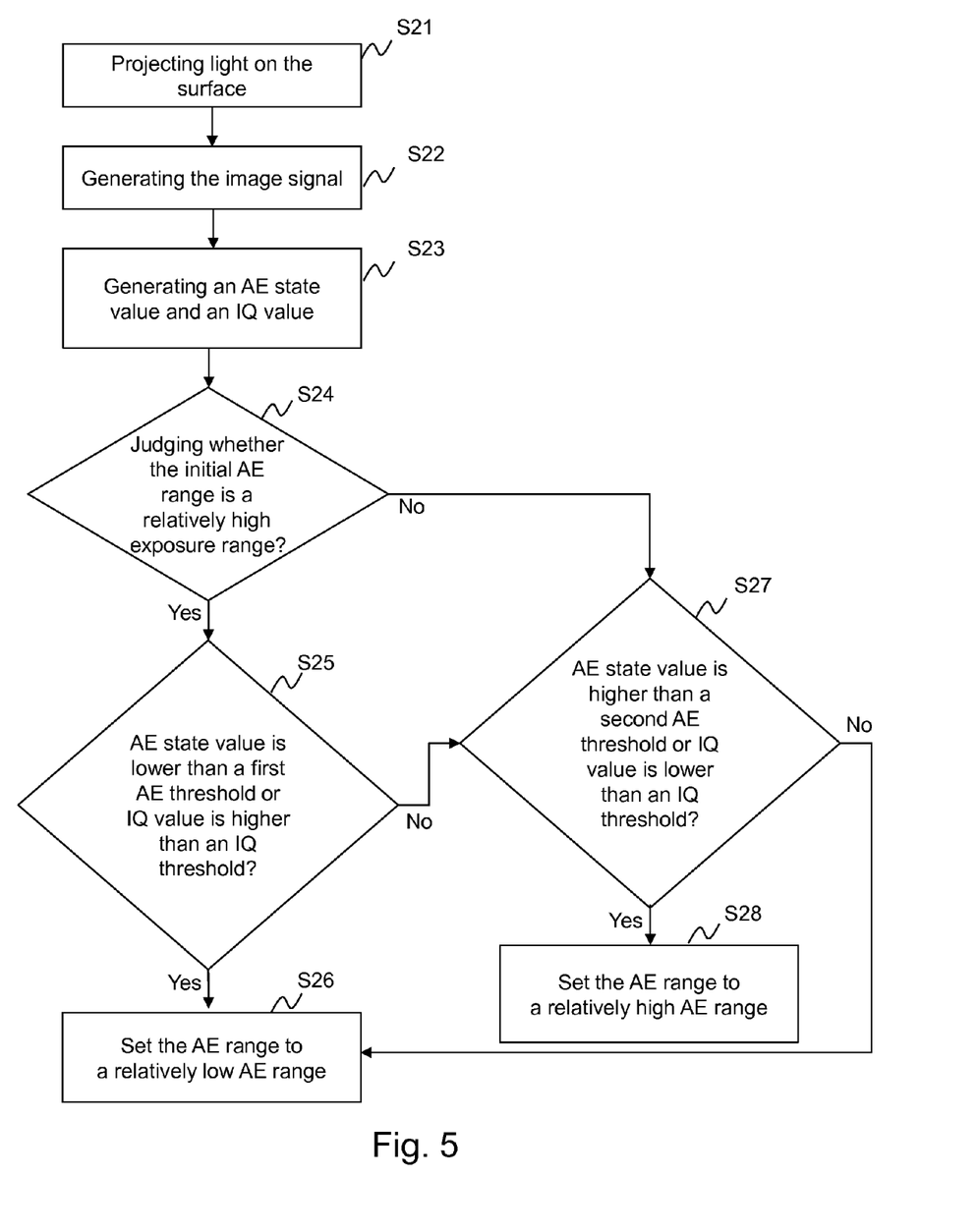
FIG. 5 shows a fourth embodiment of the present invention.

FIG. 5 shows a fourth embodiment of the present invention, which illustrates a flowchart of determining the AE range by another approach. First, as shown in the step S21 of FIG. 5, the light source projects light on the surface. Next, as shown in the step S22 of FIG. 5, the image capturing unit generates the image signal. Next, as shown in the step S23 of FIG. 5, the processing unit calculates the AE state value of the image signal. Next, as shown in the step S24 of FIG. 5, the processing unit judges whether the initial AE range is a relatively high exposure range, and determining the AE range according to following conditions:

(1) when the initial AE range is a relatively high exposure range and either the AE state value is lower than a first AE threshold or the IQ value is higher than an IQ value threshold (the step S25), the processing unit sets the AE range to a relatively low exposure range (the step S26);

(2) when the initial AE range is the relatively high exposure range and either the AE state value is not lower than the first AE threshold or the IQ value is not higher than the IQ value threshold (the step S25), the processing unit determines the AE range according to the following condition (3) or (4):

(3) when the above-mentioned condition (2) occurs or when the initial AE range is not the relatively high exposure range, and when either the AE state value is higher than a second AE threshold or the IQ value is lower than the IQ value threshold (the step S27), the processing unit sets the AE range to the relatively high exposure range (the step S28);

(4) when the above-mentioned condition (2) occurs or when the initial AE range is not the relatively high exposure range, and when either the AE state value is not higher than the second AE threshold or the IQ value is not lower than the IQ value threshold (the step S27), the processing unit sets the AE range to the relatively low exposure range (the step S26).

Figure 6:
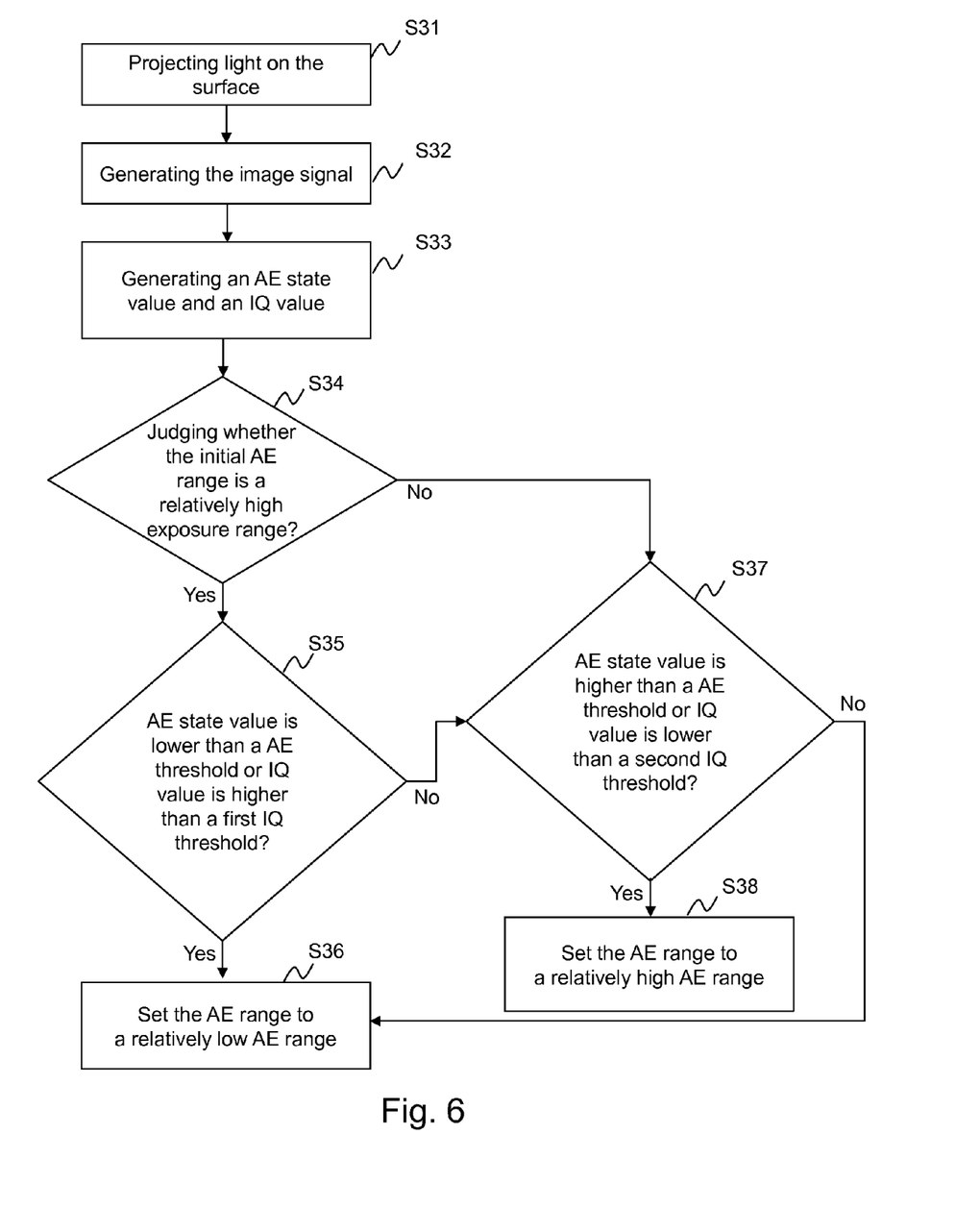
FIG. 6 shows a fifth embodiment of the present invention.

FIG. 6 shows a fifth embodiment of the present invention, which illustrates a flowchart of determining the AE range by yet another approach. First, as shown in the step S31 of FIG. 6, the light source projects light on the surface. Next, as shown in the step S32 of FIG. 6, the image capturing unit generates the image signal. Next, as shown in the step S33 of FIG. 6, the processing unit calculates the AE state value of the image signal. Next, as shown in the step S34 of FIG. 6, the processing unit judges whether the initial AE range is a relatively high exposure range, and determining the AE range according to following conditions:

(1) when the initial AE range is a relatively high exposure range and either the AE state value is lower than a AE threshold or the IQ value is higher than a first IQ value threshold (the step S35), the processing unit sets the AE range to a relatively low exposure range (the step S36);

(2) when the initial AE range is the relatively high exposure range and either the AE state value is not lower than the AE threshold or the IQ value is not higher than the first IQ value threshold (the step S35), the processing unit determines the AE range according to the following condition (3) or (4):

(3) when the above-mentioned condition (2) occurs or when the initial AE range is not the relatively high exposure range, and when either the AE state value is higher than the AE threshold or the IQ value is lower than a second IQ value threshold (the step S37), the processing unit sets the AE range to the relatively high exposure range (the step S38);

(4) when the above-mentioned condition (2) occurs or when the initial AE range is not the relatively high exposure range, and when either the AE state value is not higher than the AE threshold or the IQ value is not lower than the second IQ value threshold (the step S37), the processing unit sets the AE range to the relatively low exposure range (the step S36).

Figure 7:
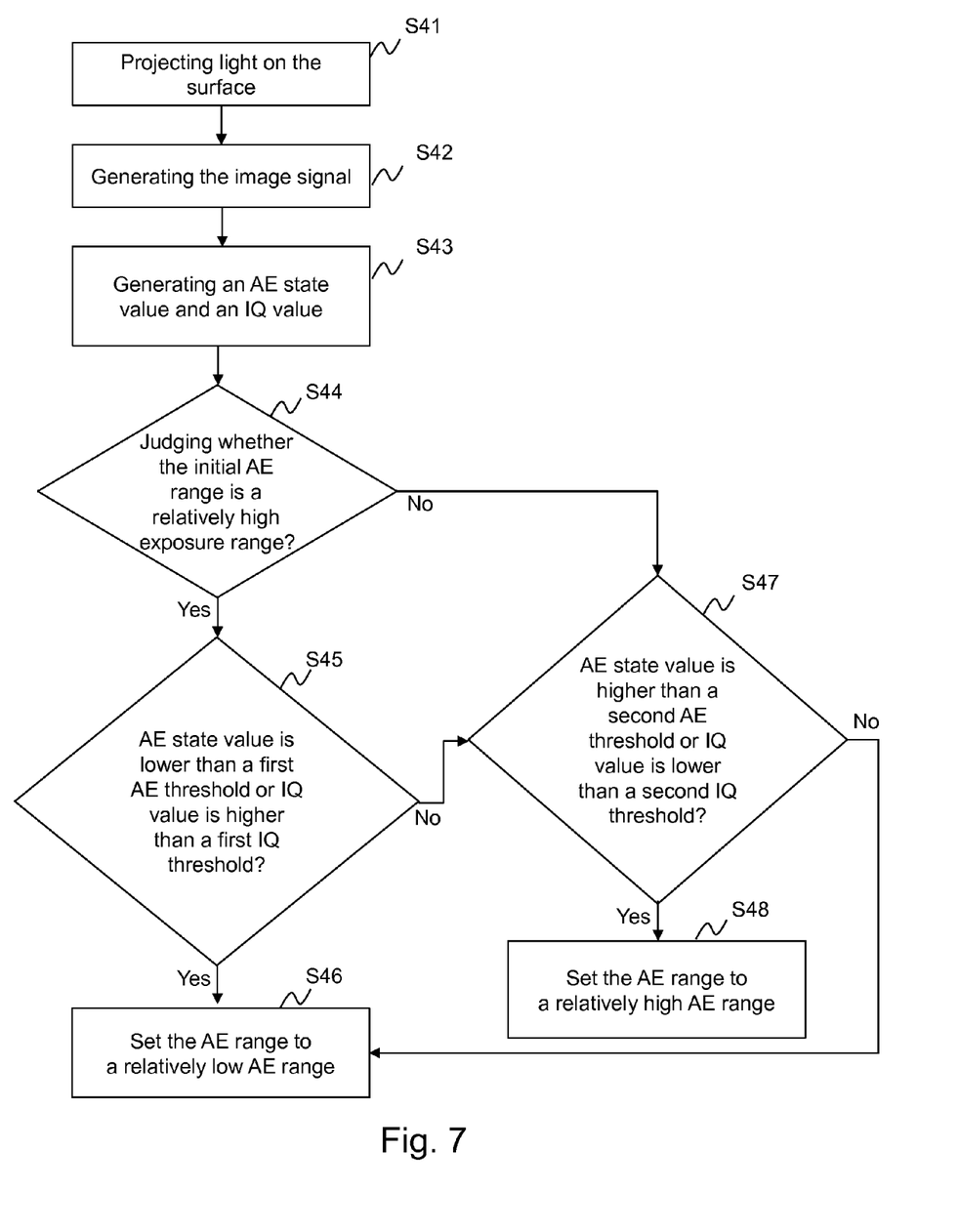
FIG. 7 shows a sixth embodiment of the present invention.

FIG. 7 shows a sixth embodiment of the present invention, which illustrates still another flowchart of determining the AE range. First, as shown in the step S41 of FIG. 7, the light source projects light on the surface. Next, as shown in the step S42 of FIG. 7, the image capturing unit generates the image signal. Next, as shown in the step S43 of FIG. 7, the processing unit calculates the AE state value of the image signal. Next, as shown in the step S44 of FIG. 7, the processing unit judges whether the initial AE range is a relatively high exposure range, and determining the AE range according to following conditions:

(1) when the initial AE range is a relatively high exposure range and either the AE state value is lower than a first AE threshold or the IQ value is higher than a first IQ value threshold (the step S45), the processing unit sets the AE range to a relatively low exposure range (the step S46);

(2) when the initial AE range is the relatively high exposure range and either the AE state value is not lower than the first AE threshold or the IQ value is not higher than the first IQ value threshold (the step S45), the processing unit determines the AE range according to the following condition (3) or (4):

(3) when the above-mentioned condition (2) occurs or when the initial AE range is not the relatively high exposure range, and when either the AE state value is higher than a second AE threshold or the IQ value is lower than a second IQ value threshold (the step S47), the processing unit sets the AE range to the relatively high exposure range (the step S48);

(4) when the above-mentioned condition (2) occurs or when the initial AE range is not the relatively high exposure range, and when either the AE state value is not higher than the second AE threshold or the IQ value is not lower than the second IQ value threshold (the step S47), the processing unit sets the AE range to the relatively low exposure range (the step S46).

It should be noted that in the above-mentioned embodiments, the initial AE range can be a predetermined default setting, a range determined by detecting the surrounding environment, or a range determined according to the last stored AE range, all of which are within the scope of the present invention. The AE threshold, the first AE threshold and the second AE threshold are predetermined threshold values of the AE state value, in which the first AE threshold is, for example but not limited to, smaller than or equal to the second AE threshold. The IQ value threshold, the first IQ value threshold and the second IQ value threshold are predetermined threshold values of the IQ value. The first IQ value threshold is, for example but not limited to, greater than or equal to the second IQ value threshold. In addition, in a typical optical mouse, the AE range is generally between 0-255, and is the prior art often sets it between 100-150. In the present invention, for example, the relatively low AE range is between 100-150 and the relatively high AE range is between 151-190; or, for another example, the relatively low AE range and the relatively high AE range can be two non-overlapping ranges within the range of 0-255, and as an example, the relatively low AE range may be between 90-140 and the relatively high AE range may be between 161-200. In another embodiment, the relatively low AE range and the relatively high AE range can be two non-overlapping ranges. In addition, the relatively low AE range and the relatively high AE range are not limited to two fixed ranges; instead, the relatively low AE range and the relatively high AE range can be dynamically set. For example, after an initial AE range is determined and a process in any of the above-mentioned embodiments is performed, the new AE range can be set to another relatively high or relatively low AE range which is adjusted to have a different range than a previous relatively high or relatively low AE range. Furthermore, please note that the judgment does not have to start by judging whether the initial AE range is a relatively high exposure range (the step S14, 24, 34 or 44); it is equivalent to start the judgment by judging whether the initial AE range is a relatively low exposure range.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. For example, a device which does not substantially influence the primary function of a signal can be inserted between any two circuits or devices in the shown embodiments. For another example, the shapes of the devices or the structure parts are not limited to those as shown, and they can be modified to any other shapes. In view of the foregoing, the spirit of the present invention should cover all such and other modifications and variations, which should be interpreted to fall within the scope of the following claims and their equivalents.

What is claimed is:

1. An optical displacement detection apparatus, comprising:
   a light source for projecting light on a surface;
   an image capturing unit for generating an image signal according to light reflected from the surface; and
   a processor generates an auto-exposure(AE) state value and an image quality (IQ) value according to the image signal, and determining an AE range according to an initial AE range, the AE state value and the IQ value, wherein the processor determines the AE range according to following conditions:
   (1) when the initial AE range is a predetermined high exposure range and either the AE state value is lower than a AE threshold or the IQ is higher than an IQ threshold, the processor sets the AE range to a predetermined low exposure range which is lower than the predetermined high exposure range;
   (2) when the initial AE range is the predetermined high exposure range and either the AE state value is not lower than the AE threshold or the IQ is not higher Loan the IQ threshold, the processor sets the AE range to the predetermined high exposure range;
   (3) when the initial AE range is not the predetermined high exposure range and either the AE state value is higher than the AE threshold or the IQ is lower than the IQ threshold, the processor sets the AE range to the predetermined high exposure range; and
   (4) when the initial AE range is the predetermined low exposure range and either the AE state value is not higher than the AE threshold or the IQ is not lower than the IQ threshold, the processor sets the AE range to the predetermined low exposure range.

2. The optical displacement detection apparatus of claim 1, wherein the processor adjusts the image signal according to the AE range so as to determine a displacement of the optical displacement detection apparatus.

3. An optical displacement detection apparatus, comprising:
   a light source for projecting light on a surface;
   an image capturing unit for generating an image signal according to light reflected from the surface; and
   a processor generates an auto-exposure(AE) state value and an image quality (IQ) value according to the image signal, and determining an AE range according to an initial AE range, the AE state value and the IQ value, wherein the processor determines the AE range according to following conditions:
   (1) when the initial AE range is a predetermined high exposure range and either the AE state value is lower than a first AE threshold or the IQ is higher than an IQ threshold, the processor sets the AE range to a predetermined low exposure range which is lower than the predetermined high exposure range; and
   (2) when the initial AE range is the predetermined high exposure range and either the AE state value is not lower than the first Ad threshold or the IQ is not higher than the IQ threshold, the processor determines the AE range according to the following condition (3) or(4):
   (3) when the above-mentioned condition (2) occurs or when the in AE range is the predetermined low exposure range, and when either the AE state value is higher than a second AE threshold or the IQ is lower than the IQ threshold, the processor sets the AE range to the predetermined high exposure range; and
   (4) when the above-mentioned condition (2) occurs or when the initial AE range is the predetermined low exposure range, and when either the AE state value is not higher than the second AE threshold or the IQ is not lower than the IQ threshold, the processor sets the AE range to the predetermined low exposure range.

4. The optical displacement detection apparatus of claim 3, wherein the processor adjusts the image signal according to the AE range so as to determine a displacement of the optical displacement detection apparatus.

5. An optical displacement detection apparatus, comprising:
   a light source for projecting light on a surface;

an image capturing unit for generating an image signal according to light reflected from the surface; and a processor generates an auto-exposure(AE) state value and an image quality (IQ) value according to the image signal, and determining an AE range according to an initial AE range, the AE state value and the IQ value, wherein the processor determines the AE range according to following conditions:

(1) when the initial AE range is a predetermined high exposure range and either the AE state value is lower than a AE threshold or the IQ is higher than a first IQ threshold, the processor sets the AE range to a predetermined low exposure range which is lower than the predetermined high exposure range; and (2) when the initial AE range is the predetermined high exposure range and either the AE state value is not lower than the AE threshold or the IQ is not higher than the first IQ threshold, the processor determines the AE range according to the following condition (3) or (4):

(3) when the above-mentioned condition (2) occurs or when the initial AE range is the predetermined low exposure range, and when either the Ad state value is higher than the AE threshold or the IQ is lower than a second IQ threshold, the processor sets the AE range to the predetermined high exposure range; and (4) when the above-mentioned condition (2) occurs or when the initial AE range is the predetermined low exposure range, and when either the AE state value is not higher than the AE threshold or the IQ is not lower than the second IQ threshold, the processor sets the AE range to the predetermined low exposure range.

6. The optical displacement detection apparatus of claim 5, wherein the processor adjusts the image signal according to the AE range so as to determine a displacement of the optical displacement detection apparatus.

7. An optical displacement detection apparatus, comprising:

alight source for projecting light on a surface;

an image capturing unit for generating an image signal according to light reflected from the surface; and a processor generates an auto-exposure(AE) state value and an image quality (IQ) value according to the image signal, and determining an AE range according to an initial AE range, the AE state value and the IQ value, wherein the processor determines the AE range according to following conditions:

(1) when the initial AE range is a predetermined high exposure range and either the AE state value is lower than a first AE threshold or the IQ is higher than a first IQ threshold, the processor sets the AE range to a predetermined low exposure range which is lower than the predetermined high exposure range; and (2) when the initial AE range is the predetermined high exposure range and either the AE state value is not lower than the first AE threshold or the IQ is not higher than the first IQ threshold, the processor determines the AE mange according to the following condition (3) or (4):

(3)when the above-mentioned condition (2) occurs or when the initial AE range is she predetermined low exposure range, and when either the AE state value is higher than a second AE threshold or the IQ is loser than a second IQ threshold, the processor sets the AE range to the predetermined high exposure range; and (4) when the above-mentioned condition (2) occurs or when the initial AE range is the predetermined low exposure range, and when either the AE state value is not higher than the second AE threshold or the IQ is not lower than the second IQ threshold, the processor sets the AE range to the predetermined low exposure range.

8. The optical displacement detection apparatus of claim 7, wherein the processor adjusts the image signal according to the AE range so as to determine a displacement of the optical displacement detection apparatus.

9. An optical displacement detection method, comprising:

projecting light on a surface;

generating an image signal according to light reflected from the surface;

generating an auto-exposure(AE) state value and an image quality (IQ) value according to the image signal; and determining an AE range according to an initial AE range, the AE state value and the IQ value wherein the step of determining the AE range further comprises:

determining the AE range according to following conditions:

(1) when the initial AE range is a predetermined high exposure range and either the AE state value is lower than a AE threshold or the IQ is higher than an IQ threshold, setting the AE range to a predetermined low exposure range which is lower than the predetermined high exposure range;

(2) when the initial AE range is the predetermined high exposure range and either the AE state value is not lower than the AE threshold or the IQ is not higher than the IQ threshold, setting the AE range to the predetermined high exposure range;

(3) when the initial AE range is the predetermined low exposure range and either the AE state value is higher than the AE threshold or the IQ is lower than the IQ threshold, setting the AE range to the predetermined high exposure range; and (4) when the initial AE range is the predetermined low exposure range and either the AE state value is not higher than the AE threshold or the IQ is not lower than the IQ threshold, setting the AE range to the predetermined high exposure range.

10. The optical displacement detection method of claim 9, further comprising:

adjusting the image signal according to the AE range so as to determine a displacement.

11. An optical displacement detection method, comprising:

projecting light on a surface;

generating an image signal according to light reflected from the surface;

generating an auto-exposure(AE) state value and an image quality (IQ) value according to the image signal; and determining an AE range according to an initial AE range, the AE state value and the IQ value wherein the step of determining the AE range further comprises:

determining the AE range according to following conditions:

(1) when the initial AE range is a predetermined high exposure range and either the AE state value is lower than a first AE threshold or the IQ is higher than an IQ threshold, setting the AE range to a predetermined low exposure range which is lower than the predetermined high exposure range; and (2) when the initial AE range is the predetermined high exposure range and either the AE state value is not lower than the first AE threshold or the IQ is not higher than the IQ threshold, determining the AE range according to the following condition (3) or (4):

(3) when the above-mentioned condition (2) occurs or when the initial AE range is the predetermined low exposure range, and when either the AE state value is higher than a second AE threshold or the IQ is lower than the IQ threshold, setting the AE range to the predetermined high exposure range; and (4) when the above-mentioned condition (2) occurs or when the initial AE range is the predetermined low exposure range, and when either the AE state value is not higher than the second AE threshold or the IQ is not lower than the IQ threshold, setting the AE range to the predetermined low exposure range.

12. The optical displacement detection method of claim 11, further comprising:

adjusting the image signal according to the AE range so as to determine a displacement.

13. An optical displacement detection method, comprising:

projecting light on a surface;

generating an image signal according to light reflected from the surface;

generating an auto-exposure(AE) state value and an image quality (IQ) value according to the image signal; and determining an AE range according to an initial AE range, the AE state value and the IQ value wherein the step of determining the AE range further comprises:

determining the AE range according to following conditions:

(1) when the initial AE range is a predetermined high exposure range and either the AE state value is lower than a AE threshold or the IQ is higher than a first IQ threshold, setting the AE range to a predetermined low exposure range which is lower than the predetermined high exposure range; and (2) when the initial AE range is the predetermined high exposure range and either the AE state value is not lower than the AE threshold or the IQ is not higher than the first IQ threshold, determining the AE range to the following condition (3) or (4):

(3) when the above-mentioned condition (2) occurs or when the initial AE range is the predetermined low exposure range, and when either the AE state value is higher than the AE threshold or the IQ is lower than a second IQ threshold, setting the AE range to the predetermined high exposure range; and (4) when the above-mentioned condition (2) occurs or when the initial AE range is the predetermined low exposure range, and when either the AE state value is not higher than the AE threshold or the IQ is not lower than the second IQ threshold, setting the AE range to the predetermined low exposure range.

14. The optical displacement detection method of claim 13, further comprising:

adjusting the image signal according to the AE range so as to determine a displacement.

15. An optical displacement detection method, comprising:

projecting light on a surface;

generating an image signal according to light reflected from the surface;

generating an auto-exposure(AE) state value and an image quality (IQ) value according to the image signal; and determining an AE range according to an initial AE range, the AE state value and the IQ value wherein the step of determining the AE range further comprises:

determining the AE range according to following conditions:

(1) when the initial AE range is a predetermined high exposure range and either the AE state value is lower than a first AE threshold or the IQ is higher than a first IQ threshold, setting the AE range to a predetermined low exposure range; and (2) when the initial AE range is the predetermined high exposure range and either the AE state value is not lower than the first AE threshold or the IQ is not higher than the first IQ threshold, determining the AE range according to the following condition (3) or (4):

(3) when the above-mentioned condition (2) occurs or when the initial AE range is the predetermined low exposure range, and when either the AE state value is higher than a second AE threshold or the IQ is lower than a second IQ threshold, setting the AE range to the predetermined high exposure range; and (4) when the above-mentioned condition (2) occurs or when the initial AE range is the predetermined low exposure range, and when either the AE state value is not higher than the second AE threshold or the IQ is not lower than the second IQ threshold, setting the AE range to the predetermined low exposure range.

16. The optical displacement detection method of claim 15, further comprising:

adjusting the image signal according to the AE range so as to determine a displacement.

* * * * *